No. 621,683. Patented Mar. 21, 1899.
W. KNIGHT.
DUST PAN HOLDER.
(Application filed Sept. 4, 1897. Renewed Feb. 2, 1899.)

(No Model.)

Witnesses
J. A. Brophy
Victor J. Evans

Inventor
Will Knight
by John Wedderburn.
Attorney

THE NORRIS PETERS CO., PHOTO-LITHO., WASHINGTON, D. C.

UNITED STATES PATENT OFFICE.

WILL KNIGHT, OF MARQUETTE, WYOMING.

DUST-PAN HOLDER.

SPECIFICATION forming part of Letters Patent No. 621,683, dated March 21, 1899.

Application filed September 4, 1897. Renewed February 2, 1899. Serial No. 704,302. (No model.)

*To all whom it may concern:*

Be it known that I, WILL KNIGHT, a citizen of the United States, residing at Marquette, in the county of Bighorn and State of Wyoming, have invented certain new and useful Improvements in Dust-Pan Holders; and I do hereby declare the following to be a full, clear, and exact description of the invention, such as will enable others skilled in the art to which it appertains to make and use the same.

The object of my invention is to provide an attachment for dust-pans whereby the same may be operated by foot and moved from point to point and may, when desired, be held in close contact with the floor.

The invention consists of a dust-pan whose handle is constructed of twisted wire formed with an elongated loop at one point therein and a substantially U-shaped loop whose outer vertical arm is longer than the inner and both of whose arms are provided with eyes at their upper ends, through which the handle of the dust-pan is adapted to be passed, said eyes engaging the outer ends of the loop in said handle.

The invention is clearly illustrated in the accompanying drawings, in which—

Figure 1:
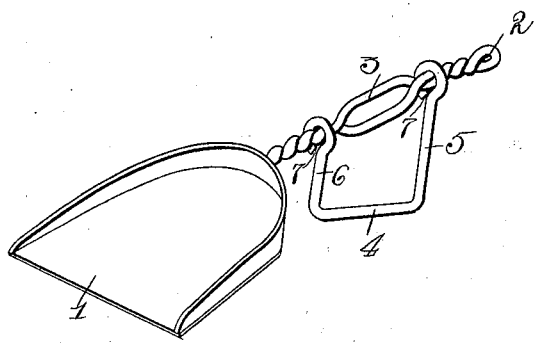
Figure 2:
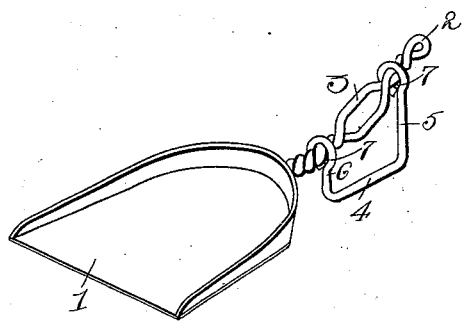
Figure 3:
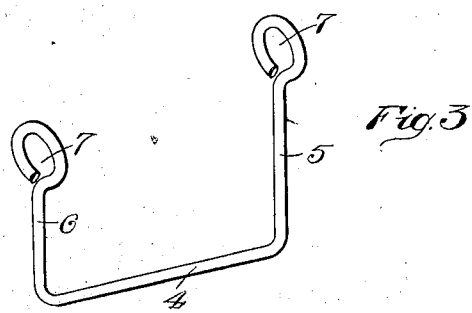

Figure 1 represents a perspective view of a dust-pan with my improved attachment shown applied thereto. Fig. 2 represents a similar view of the same with the loop depressed by the foot of the operator. Fig. 3 is a similar detail view of the loop.

Like reference-numerals indicate like parts in the different views.

The dust-pan 1 may be of the usual form of construction; but I prefer to form the handle 2 thereof of wire with an enlarged portion or loop 3 at a point intermediate of its ends. Adapted to be attached to the handle 2 is a substantially U-shaped loop 4, of wire or other like material, one of the vertical arms 5 thereof being longer than the arm 6. Each of the arms 5 and 6 has an eye 7 upon its upper end, through which the handle 2 is adapted to be passed, the said loop 4 being held in place upon the handle by the engagement of the eyes with the outer ends of the loop or enlargement 3. When applied in the manner described, with the longer arm 5 toward the outer end of the handle 2, the pan 1 will normally rest upon its forward edge and upon the lower outer corner of the loop 4. The foot of the operator is adapted to be inserted into the loop 4, and the pan may be readily moved from point to point without the necessity of leaning over and grasping the handle with the hand. When it is desired to sweep up dust or dirt into the pan 1, the foot of the operator is depressed, forcing downwardly the forward end of the loop 4 and holding the forward edge of the pan 1 in close contact with the floor.

The device is extremely simple in construction and may, if desired, be applied to ordinary dust-pans now in use.

Having now described my invention, what I claim as new, and desire to secure by Letters Patent, is—

The combination with a dust-pan and the handle thereof, the said handle being constructed of twisted wire and formed with an elongated loop at one point therein, of an attachment therefor consisting of a substantially U-shaped loop whose outer vertical arm is longer than the inner, and both of whose arms are provided with eyes at their upper ends through which the handle of the dust-pan is adapted to be passed, said eyes engaging the ends of the loop in said handle, substantially as and for the purpose described.

In testimony whereof I have signed this specification in the presence of two subscribing witnesses.

WILL KNIGHT.

Witnesses:
 CARL SORRENSON,
 J. H. JORDAN.